United States Patent [19]
Hall et al.

[11] Patent Number: 4,859,147
[45] Date of Patent: Aug. 22, 1989

[54] COOLED GAS TURBINE BLADE

[75] Inventors: Kenneth B. Hall, Jupiter; Kenneth K. Landis, Tequesta, both of Fla.

[73] Assignee: United Technologies Corporation, Hartford, Conn.

[21] Appl. No.: 147,465

[22] Filed: Jan. 25, 1988

[51] Int. Cl.[4] .............................................. F01D 5/18
[52] U.S. Cl. .................................... 416/97 R; 415/115
[58] Field of Search ................ 416/95, 97 R; 415/115

[56] References Cited

U.S. PATENT DOCUMENTS

| 2,220,420 | 11/1940 | Meyer | 416/97 R X |
|---|---|---|---|
| 3,301,526 | 12/1964 | Chamberlain | 253/39.1 |
| 3,423,069 | 1/1969 | Chandley | 416/97 R X |
| 3,533,711 | 10/1970 | Kercher | 416/97 R X |
| 3,540,811 | 11/1970 | Davis | 416/97 R X |
| 3,542,486 | 11/1970 | Kercher et al. | 416/97 R X |
| 4,026,659 | 5/1977 | Freeman | 415/115 |
| 4,229,140 | 12/1978 | Scott | 416/97 |
| 4,303,374 | 12/1981 | Braddy | 416/97 |
| 4,314,442 | 2/1982 | Rice | 416/97 R X |
| 4,565,490 | 1/1986 | Rice | 416/97 R X |
| 4,601,638 | 7/1986 | Hill et al. | 415/115 X |

FOREIGN PATENT DOCUMENTS

| 2044963 | 12/1971 | Fed. Rep. of Germany | 416/97 R |
|---|---|---|---|
| 114806 | 9/1980 | Japan | 416/97 R |
| 47103 | 3/1983 | Japan | 415/115 |
| 173502 | 10/1984 | Japan | 416/97 R |
| 226751 | 7/1943 | Switzerland | 416/97 R |
| 846583 | 8/1960 | United Kingdom | 416/97 R |

Primary Examiner—Everette A. Powell, Jr.
Attorney, Agent, or Firm—Edward L. Kochey, Jr.

[57] ABSTRACT

The airfoil shaped body has a separate leading edge portion (14) spaced from the main body (12). Slots (22) thereby formed discharge cooling air parallel to surface (38) of the main body. A step change across the slot between the leading edge surface (52) and the main body surface (38) facilitates smooth introduction of cooling air.

5 Claims, 2 Drawing Sheets

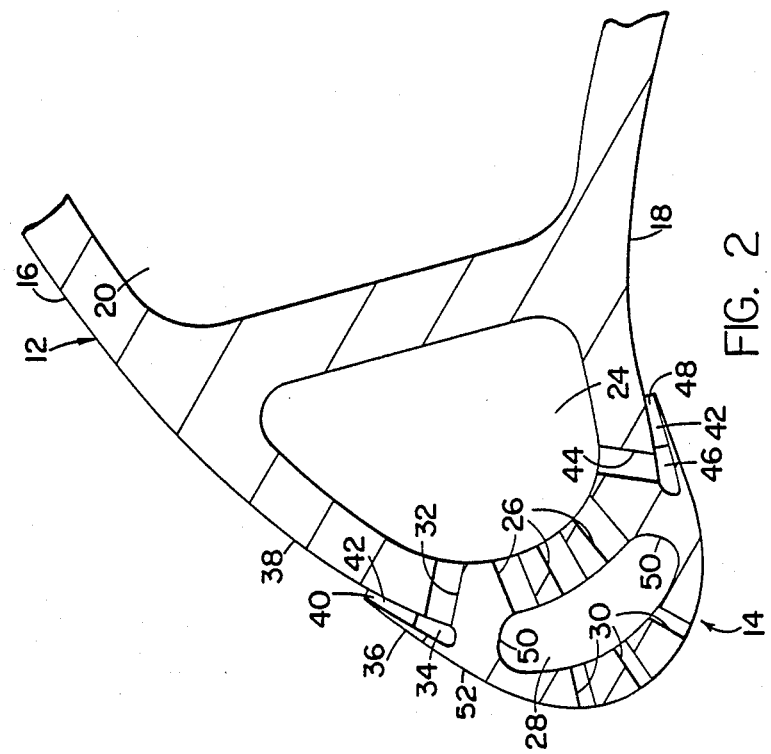

COOLED GAS TURBINE BLADE

TECHNICAL FIELD

The invention relates to gas turbine blades and in particular to blades using film air cooling.

BACKGROUND OF THE INVENTION

In gas turbines one of the limitations on gas temperature, and therefore efficiency of the gas turbine engine, is the ability of turbine blades to endure the high gas temperatures. It is accordingly known to cool the external surface of airfoils by conducting cooling air through an internal cavity in the blade and through a plurality of small passages discharging the air. It is desirable that the air exiting from these passages remain entrained in the boundary layer on the surface of the airfoil for as long a distance as possible downstream of the passage providing a protecting film of cool air between the hot mainstream gas and the airfoil surface. This use of cooling air itself decreases engine efficiency and therefore it is desirable to use as small an amount as possible of cooling air. Accordingly, the designer is challenged with obtaining maximum cooling with a limited amount of air.

Typically the airflow is metered by small metering openings at the inlet to each air passageway. Since available pressure differential is fixed by other features of the engine design, the flow is established by sizing these holes. Metering at this location also provides appropriate distribution between the various airfoil cooling slots.

The angle which the flow through the passage makes with the airfoil surface and its direction with respect to the hot gas flow are also important factors. It is generally known that the closer that this cooling air comes to being tangent with the surface, the better the cooling effectiveness.

High cooling air velocities are preferable to achieve maximum cooling effect. However, where the direction of introduction of air is not completely parallel to the surface high velocity airflow is projected into the main gas stream thereby increasing the mixing with the gas stream and decreasing the effectiveness of the cooling.

SUMMARY OF THE INVENTION

The air cooled turbine blade has an airfoil shaped body with a separate leading edge portion and a main body. The leading edge portion is supported spaced from the main body with a plenum in between and with cooling air conducted to the plenum. The leading edge portion has a tail overlapping the surface of the main body on both the pressure and suction side. This forms a longitudinally extending slot between the two which is in fluid communication with the plenum. The main body has a continuous surface extending from the airfoil surface past the slot so that air issuing from the slot is completely parallel to the downstream surface.

The slot is restricted with respect to the airflow area supplying the slot so that it is metered by the slot and high velocity air passes tangential to the surface. This decreases the mixing with the surrounding air and extends the cooling effect of the airflow downstream farther than conventional airflow introduction methods.

A plurality of vanes connect the tail with the main body providing for straightening of the flow and limitation on the variation in flow area along the length of the slot.

Concentrating this coolant injection near the leading edge of the airfoil reduces mixing losses because the coolant is injected in low Mach number regions. The fact that the cooling air is completely tangential to the downstream surface permits the use of a higher cooling airflow at this location providing better film effectiveness and increased length cooling.

BRIEF DESCRIPTION OF THE DRAWINGS

FIG. 2 is a detail of the leading edge.

DESCRIPTION OF THE PREFERRED EMBODIMENT

Figure 3:
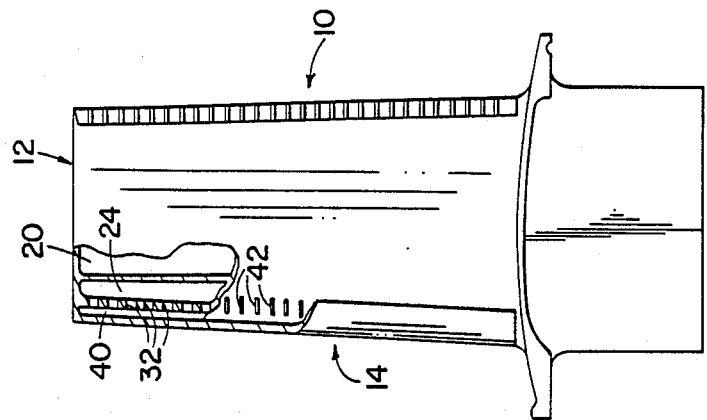
FIG. 3 is an elevation partial break away view of the turbine blade.
Figure 1:
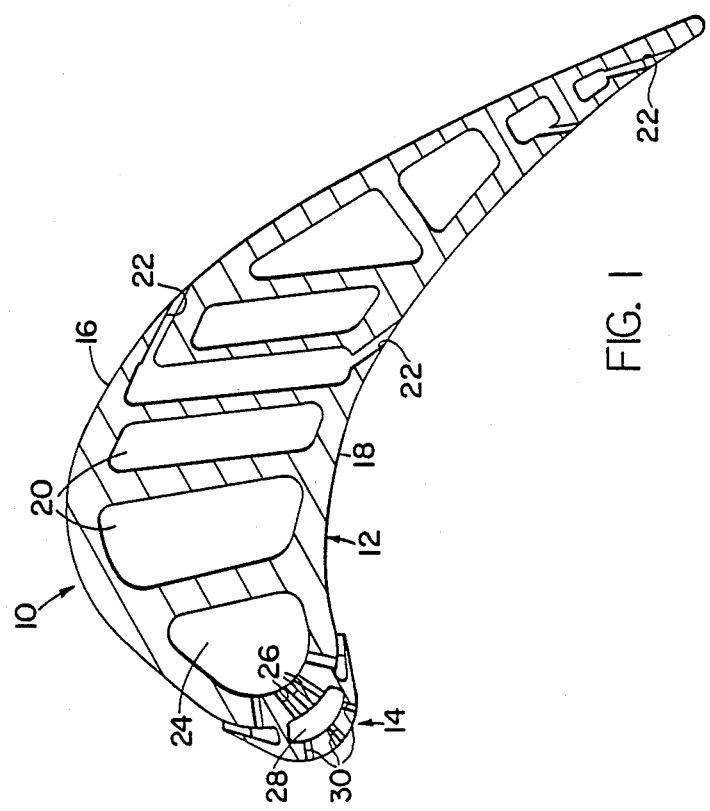
FIG. 1 is a sectional view of a turbine blade.

An airfoil shaped body 10 has a main body 12 and a leading edge portion 14. The blade has a suction side 16 and a pressure side 18.

Cooling air is passed through internal chambers 20 in a conventional manner. A plurality of conventional air cooling slots 22 may be located in the downstream portion of the blade.

From an upstream plenum 24 cooling air is passed through slots 26 to chamber 28. It passes from there through cooling openings 30 in a conventional manner. This serves to cool the leading edge of the leading edge portion 14.

Cooling air also passes through generously sized openings 32 supplying a plenum 34. The leading edge portion 14 has a tail 36 overlapping surface 38 of the main body 12. This main body has a continuous surface extending past the slots. Air from plenum 34 is discharged through longitudinally extending slot 40 with the flow area of the slot being less than the flow area of the supply path. This provides metering of the flow at this location and high velocity introduction of air along surface 38. A plurality of axially extending fins 42 interconnect lip 36 and the surface 38 of the main body portion. This provides straightening of the flow and also provides a means for maintaining consistent flow area of this discharge slot.

In a similar manner the pressure side of the blade has a plurality of openings 44 supplying cooling air to plenum 46 from which it passes through slot 48.

The airfoil may either be cast as a unit or manufactured in two pieces bonded together along longitudinally extending struts 50 after machining the flow holes 32, 26, and 44. Sharp edges of lip 36 are preferably used to maximize film effectiveness. It is also noted that the leading edge portion can be easily repaired by machining off the damaged leading edge portion and bonding on another one.

With the high velocity air issuing from slot 40 completely tangential to surface 38 extensive downstream cooling is achieved. Accordingly, more cooling air may be introduced at this location providing for larger slots and even better film effectiveness.

The outer surface 52 of the leading edge portion is offset from the continuous surface 38 of the main body 12. A natural gap is thereby provided to smoothly accept the cooling air flow into the gas stream with very little mixing.

What is claimed is:
1. An air cooled turbine blade comprising:

an airfoil shaped body having a leading edge portion having an outer surface and a main body having an outer surface;

two longitudinally extending struts supporting said leading edge portion in spaced relationship from said main body forming a central plenum between said struts and two outer plenums;

means for conducting cooling air to each of said outer plenums;

means for conducting cooling air to said central plenum;

said leading edge portion having a tail overlapping the surface of said main body forming a longitudinally extending slot therebetween in fluid communication with each of said outer plenums;

the outer surface of said main body being continuous surface extending past each of said slots; and a plurality of openings extending through said leading edge portion from said central plenum.

2. An air cooled turbine blade as in claim 1:

a plurality of axially extending fins located between said tail and said main body.

3. An air cooled turbine blade as in claim 2:

said plurality of fins secured to said tail and said main body.

4. An air cooled turbine blade as in claim 2:

the flow area of each of said slots being less than the flow area of said means for conducting cooling air to the respective outer plenum.

5. An air cooled turbine blade as in claim 1:

the flow area of each of said slots being less than the flow area of said means for conducting cooling air to the respective outer plenum.

* * * * *